United States Patent [19]

Foster

[11] Patent Number: 4,464,147

[45] Date of Patent: Aug. 7, 1984

[54] BELT TENSIONER AND METHOD OF MAKING THE SAME

[75] Inventor: Randy C. Foster, Springfield, Mo.

[73] Assignee: Dayco Corporation, Dayton, Ohio

[21] Appl. No.: 321,369

[22] Filed: Nov. 16, 1981

[51] Int. Cl.³ .............................................. F16H 7/12
[52] U.S. Cl. ..................................... 474/135; 474/133
[58] Field of Search ............... 474/135, 138, 133, 118, 474/117, 115, 113, 109, 101

[56] References Cited

U.S. PATENT DOCUMENTS

| | | | |
|---|---|---|---|
| 1,670,914 | 5/1928 | Tesoky | 474/135 |
| 1,815,954 | 7/1931 | Opie | 474/138 |
| 2,985,270 | 5/1961 | Landeros | 474/133 |
| 4,270,906 | 6/1981 | Kraft et al. | 474/101 |
| 4,300,890 | 11/1981 | Hallmann et al. | 474/110 |

FOREIGN PATENT DOCUMENTS

| | | | |
|---|---|---|---|
| 1013701 | 12/1965 | United Kingdom | 474/135 |
| 2090938 | 7/1982 | United Kingdom | 474/135 |

*Primary Examiner*—Kenneth Dorner
*Assistant Examiner*—Anthony W. Raskob, Jr.
*Attorney, Agent, or Firm*—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a movable cam unit operatively associated with the support unit and the belt engaging unit for moving the belt engaging unit relative to the support unit, and a spring unit operatively associated with the support unit and the cam unit for urging the belt engaging unit relative to the support unit and against the belt with a force to tension the belt, the support unit comprising a tubular member having an interconnecting part and the cam unit being disposed in the tubular member and having an interconnecting part operatively interconnected with the interconnecting part of the tubular member so that the cam unit is adapted to be axially movable relative to the tubular member while being non-rotatable relative to the tubular member.

12 Claims, 8 Drawing Figures

BELT TENSIONER AND METHOD OF MAKING THE SAME

BACKGROUND OF THE INVENTION

1. Field of the Invention

This invention relates to a tensioner for an endless power transmission belt or the like as well as to a method of making such a tensioner.

2. Prior Art Statement

It is known in the art to provide a tensioner for a power transmission belt that is adapted to be operated in an endless path, the tensioner comprising a support means for being fixed relative to the belt, a belt engaging means carried by the support means and being movable relative thereto, movable cam means operatively associated with the support means and the belt engaging means for moving the belt engaging means relative to the support means, and spring means operatively associated with the support means and the cam means for urging the belt engaging means relative to the support means and against the belt with a force to tension the belt.

For example, see the following U.S. Patent:

(1) U.S. Pat. No. 4,270,906—Kraft et al.

It appears from item (1) above that a plurality of dish-shaped springs are telescopically disposed on a shaft and urge a cam means axially on the shaft into camming engagement with a cam follower on an arm pivotally mounted on the shaft and carrying an idler pulley which is urged in a tensioning direction against a belt by the force of the dish-shaped springs.

SUMMARY OF THE INVENTION

It is one feature of this invention to provide an improved tensioner for a power transmission belt or the like.

In particular, it is believed, according to the teachings of this invention, that a unique spring and camming arrangement can be provided for urging the belt engaging means of the belt tensioner in a tensioning direction.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, movable cam means operatively associated with the support means and the belt engaging means for moving the belt engaging means relative to the support means, and spring means operatively associated with the support means and the cam means for urging the belt engaging means relative to the support means and against the belt with a force to tension the belt, the support means comprising a tubular member having interconnected means and the cam means being disposed in the tubular member, the cam means having interconnecting means operatively interconnected with the interconnecting means of the tubular member, the interconnecting means being adapted to permit the cam means to be axially movable relative to the tubular member while being non-rotatable relative to the tubular member.

Accordingly, it is an object of this invention to provide an improved tensioner for a power transmission belt or the like, the tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
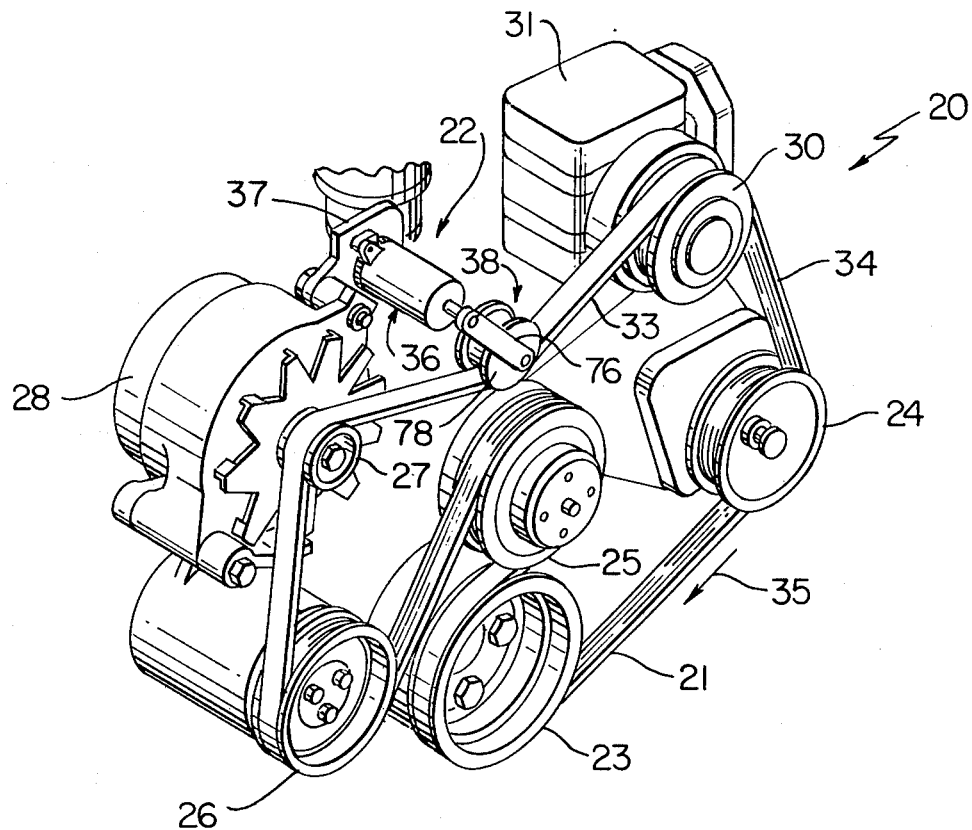
FIG. 1 is a fragmentary isometric view looking toward the front end of an automobile engine which utilizes the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Therefore, this invention is not to be limited to only the embodiment illustrated in the drawings, as the drawings are merely utilized to illustrate one of the wide variety of uses of this invention.

Figure 2:
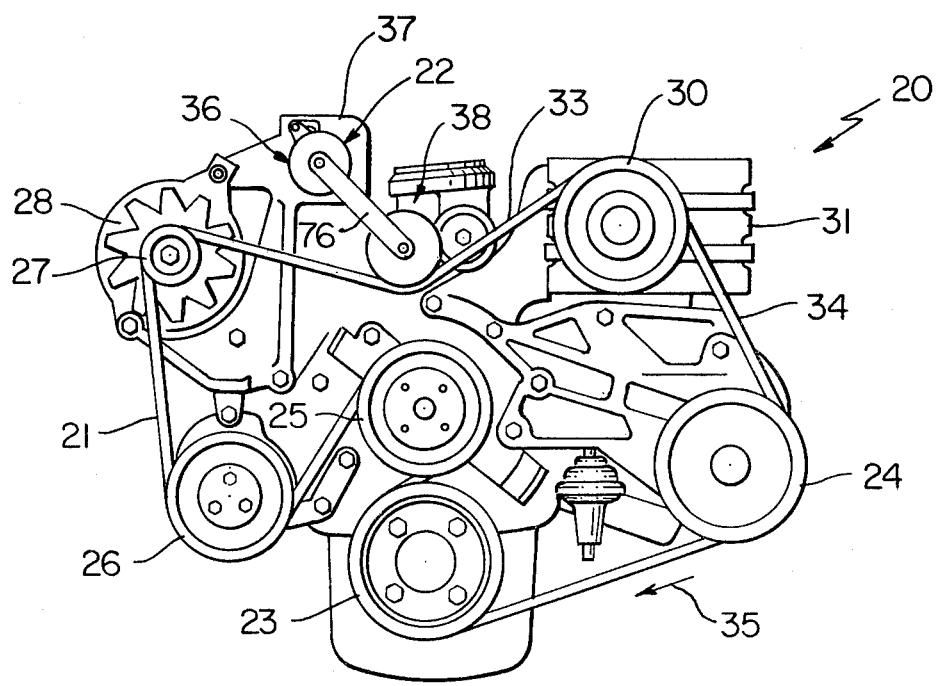
FIG. 2 is a view looking perpendicularly towards the front end of an automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because it is believed that the unique features of the tensioner 22 of this invention readily permits the tensioner 21 to tension a belt having a polyester load-carrying cord in an efficient manner as hereinafter described.

The belt 21 is driven by a driving sheave 23 which is operatively interconnected to the crank shaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28 and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the compressor 31. The cyclic change in load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that requires compensation for the same.

Thus, it is known that it is difficult to maintain a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention will function in a manner to provide a proper tension and force on the belt 21 to overcome the aforementioned problems, namely, provide the required tension in the overall belt 21 as well as prevent any tendency of the belt to oscillate in an undesirable manner as a result of the cyclic load change imposed by the compressor 31.

Figure 3:
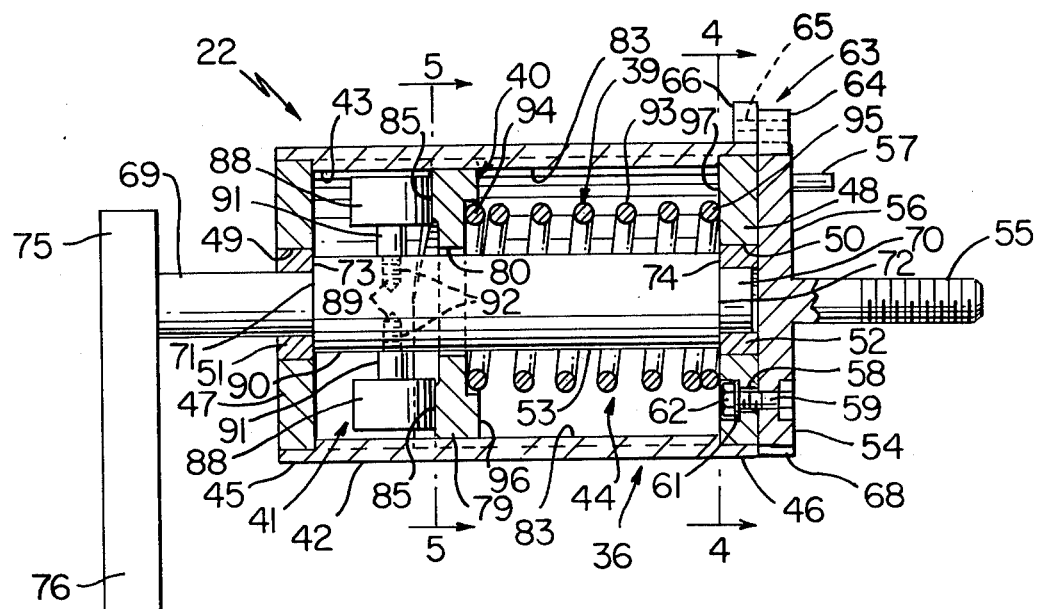
FIG. 3 is an enlarged view, partially in cross section, illustrating the improved belt tensioner of this invention that is being utilized for tensioning the power transmission belt of FIGS. 1 and 2.
Figure 5:
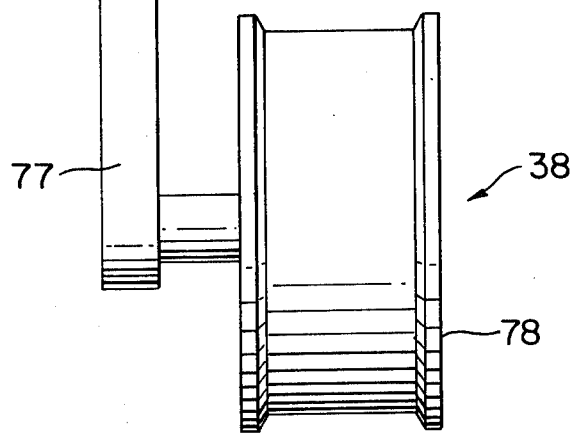
FIG. 5 is a cross-sectional view taken on line 5—5 of FIG. 3.
Figure 5:
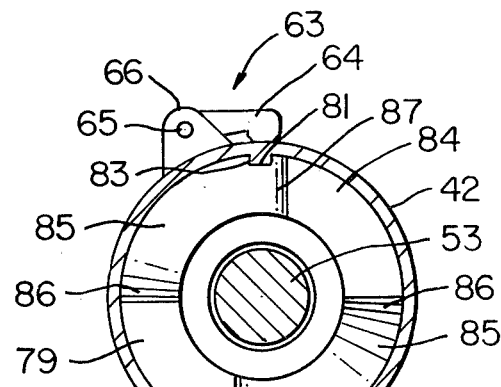
Figure 8:
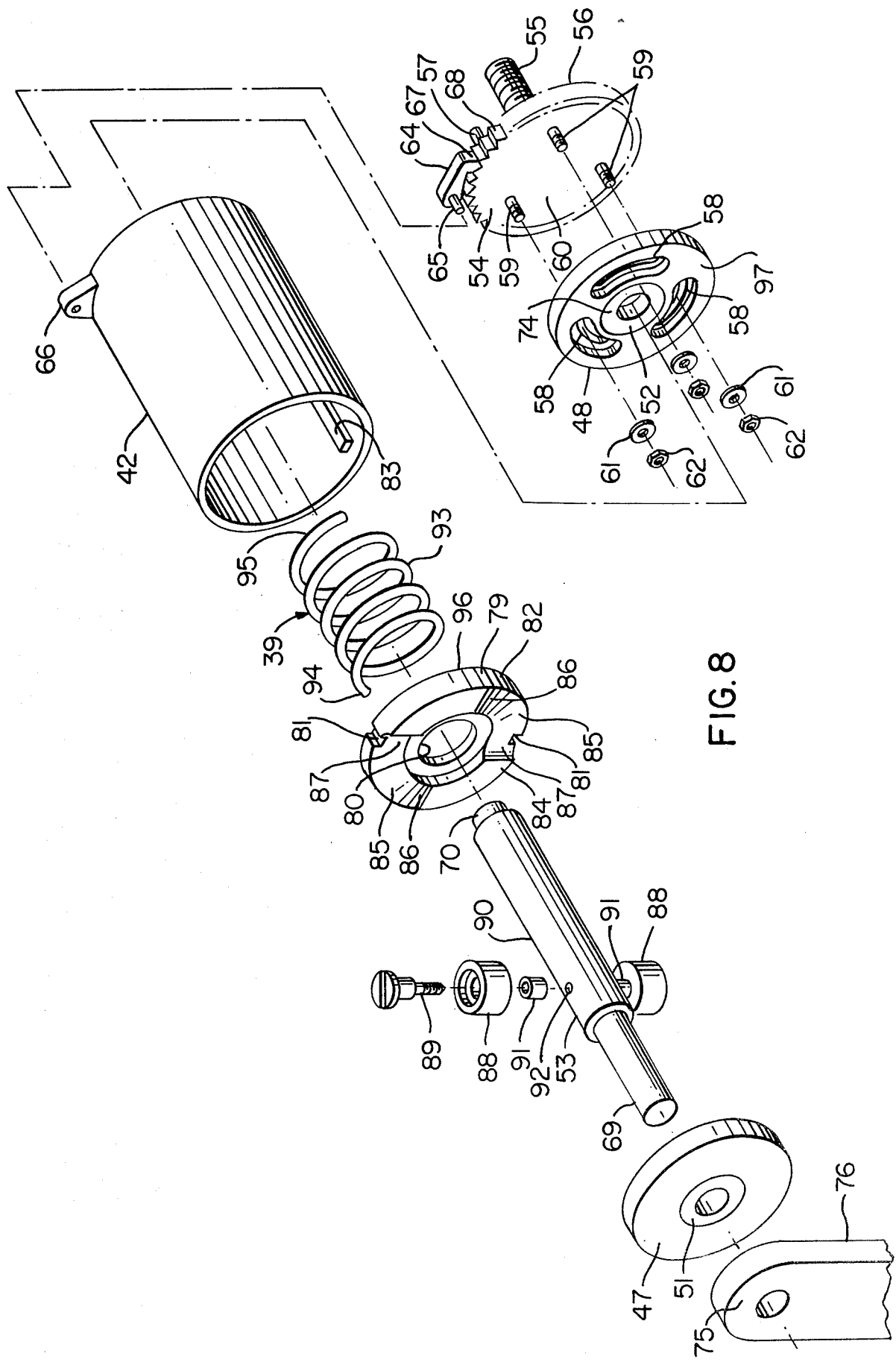
FIG. 8 is an exploded isometric view of the various parts of the belt tensioner of this invention.

As best illustrated in FIGS. 3 and 8, the improved belt tensioner 22 of this invention comprises a support means that is generally indicated by the reference numeral 36 and being adapted to be fixed in any suitable manner to a mounting bracket 37 of the engine 20 as illustrated in FIGS. 1 and 2.

A belt engaging means that is generally indicated by the reference numeral 38 is movably carried by the support means 36 in a manner hereinafter set forth and thereby forms part of the tensioner 22 of this invention.

The tensioner 22 has mechanical spring means that is generally indicated by the reference numeral 39 and is operatively associated with the support means 36 and the belt engaging means 38 in a manner hereinafter set forth to tend to urge the belt engaging means 38 against the slack side 33 of the belt 21, the spring means 39 operating on a movable cam means that is generally indicated by the reference numeral 40 and it is movably carred by the support means 36.

The cam means 40 engages against cam follower means of the belt engaging means 38, the cam follower means being generally indicated by the reference numeral 41.

The support means 36 comprises a tubular member 42 that is substantially cylindrical and has a cylindrical internal peripheral surface 43 that defines an internal chamber 44 that is closed at the opposed ends 45 and 46 of the tubular member 42 by end plates 47 and 48 that are secured to the tubular member 42 in any suitable manner. The end plates 47 and 48 respectively have openings 49 and 50 passing centrally therethrough and receive bearing means 51 and 52 therein, such as sleeve bearing means or the like, that are suitably secured in the openings 49 and 50 thereof in any suitable manner to rotatably support a shaft 53 of the belt engaging means 38.

The support means 36 includes a mounting plate 54 having a threaded bolt-like member 55 extending from the rear side 56 thereof and adapted to be received in a suitable opening (not shown) in the mounting bracket 37 of the engine 20 to secure the support means 36 and, thus, the tensioner 22 to the engine 20 in a manner well known in the art, the mounting plate 54 having additional extension means 57 extending from the rear side 56 thereof to likewise be received in suitable opening means (not shown) in the mounting bracket 37 to prevent rotational movement of the mounting plate 54 relative thereto in a manner well known in the art.

The plate 48 of the tubular member 42 has a plurality of circularly arranged elongated arcuate slots 58 passing concentrically therethrough and respectively receiving threaded members 59 that are secured to the mounting plate 54 and extend from the front side 60 thereof to respectively receive washers 61 and fastening nuts 62, FIG. 8, to secure the end plate 48 to the mounting plate 54 and, thus, secure the tubular member 42 to the mounting plate 54.

In this manner, the rotational position of the tubular member 42 on the mounting plate 54 can be adjusted for a purpose hereinafter described and when the rotational position of the tubular member 42 relative to the mounting plate 54 has been selected within the limits of the length of the slots 58 in the end plate 48, the tubular member 42 can be locked in the selected rotational position to the mounting plate 54 by a locking means that is generally indicated by the reference numeral 63.

Figure 4:
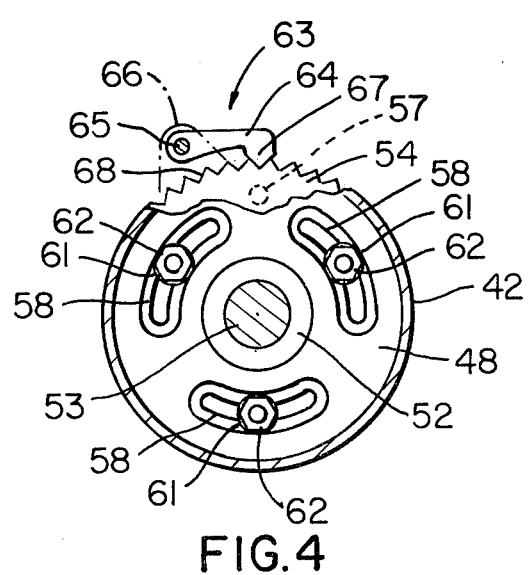
FIG. 4 is a cross-sectional view, partially broken away, and is taken on the line 4—4 of FIG. 3.

The locking means 63 comprises a pall member 64 pivotally mounted by a pivot pin 65 to an upstanding flange 66 of the tubular member 42 and has its locking end 67 adapted to be received between locking teeth 68 formed on the outer periphery of the mounting plate 54. Thus, when the locking end 67 of the pall 64 is disposed between a pair of teeth 68 on the mounting plate 54 as illustrated in FIG. 4, rotational movement of the tubular member 42 relative to the mounting plate 54 cannot take place. If desired, the locking pall 64 can be spring urged in its locking direction in a manner well known in the art.

Therefore, when assembling the tubular member 42 to the mounting plate 54, the nuts 62 on the fastening members 59 of the mounting plate 54 are tightened only sufficiently to hold the end plate 48 against the plate 54 while permitting rotational movement of the tubular member 42 relative to the plate 54 by unlocking the pall 64 and rotating the tubular member 42 relative to the plate 54 before replacing the locking pall 64 in its locking position.

The shaft 53 of the belt engaging means 38 has the opposed ends 69 and 70 thereof reduced as illustrated in FIGS. 3 and 8 to respectively define shoulders 71 and 72 thereof that respectively abut against the inside surfaces 73 and 74 of the bearing means 51 when the end plates 47 and 49 are respectively assembled on the opposed ends 69 and 70 of the shaft 53 to thereby prevent axial movement of the shaft 53 relative to the tubular member 42 while permitting rotational movement therebetween.

The end 69 of the shaft 53 is fastened to one end 75 of an arm 76 of the belt engaging means 38 which, in turn, has its other end 77 rotatably carrying an idler pulley 78 which is adapted to engage and rotate against the belt 21 as illustrated in FIGS. 1 and 2 in a manner well known in the art.

The cam means 40 comprises a cam plate 79 having an opening 80 passing centrally therethrough and being loosely telescoped on the shaft 53 so as to be axially movable relative thereto. In order to prevent rotational movement between the cam plate 79 and the tubular member 42, the cam plate 79 can be provided with interconnecting means or opposed grooves 81 in in the outer periphery 82 thereof which respectively receive interconnecting means or longitudinal splines 83 formed inwardly on the internal peripheral surface 43 of the tubular member 42 so that the cam plate 79 is adapted to move axially within the chamber 44 of the tubular member 42 while rotational movement therebetween is prevented by the splines 83 of the tubular member 42 being received in the grooves 81 thereof.

The cam plate 79 has its front face 84 provided with a pair of cam surfaces or ramps 85 respectively having high ends 86 and low ends 87 as illustrated in the drawings.

The cam follower means 41 of the belt engaging means 38 comprises a pair of cylindrical rollers 88 respectively rotatably secured to opposed sides of the shaft 53 by threaded fastening members 89, the rollers 88 being spaced from the external peripheral surface 90 of the shaft 53 by suitable spacers 91 and the threaded fastening members 89 being received in threaded bores 92 in the shaft 53 as illustrated.

In this manner, the cam followers or rollers 88 respectively are adapted to engage against the cam surfaces 85 of the cam plate 79 so that as the cam plate 79 is axially moved from right to left in FIG. 3, the cam surfaces 85 cause rotation of the shaft 53 because the rollers 88 ride down the cam surfaces or ramps 85 from the high side 86 to the low sides 87 thereof in a manner well known in the art and thereby rotate the shaft 53 which cannot be axially moved in the tubular member 42.

For example, see the aforementioned Kraft et al., U.S. Pat. No. 4,270,906 for a detailed description and illustration of a similar camming action whereby this patent is being incorporated into this disclosure by this reference thereto.

The spring means 39 comprises a coiled compression spring 93 telescopically disposed on the shaft 53 and having opposed ends 94 and 95 respectively bearing against the rear side 96 of the cam plate 79 and the side 97 of the end plate 48 of the tubular member 42 whereby the force of the compression spring 93 tends to urge the cam plate 79 from right to left in FIG. 3.

Of course, it is to be understood that other types of spring means can be utilized in place of the compression spring 93 and more than two cooperating cam surfaces 85 and cam followers 88 can be utilized if desired.

In any event, it can be seen that the tubular member 42 of the support means 36 receives therein a portion of the shaft 53, the cam followers 88, the cam plate 79 and compression spring 93 and thereby fully protects the same from dirt and impacts during the use of the tensioner 22.

From the above it can be seen that it is a relatively simple method of this invention to make the belt tensioner 22 from the parts thereof previously described to operate in a manner now to be described.

The tensioner 22 of this invention is initially mounted to the engine 20 by securing the support means 36 to the mounting bracket 37 with the threaded fastening means 55 of the mounting plate 54 so that the idler pulley 78 is disposed in engagement against the stationary belt 21 and with the cam followers 88 of the belt engaging means 38 respectively being disposed as close as possible against the high side 86 of the cam surfaces 85 of the cam plate 79 so that the compression spring 93 is under its most compressed condition.

Figure 7:
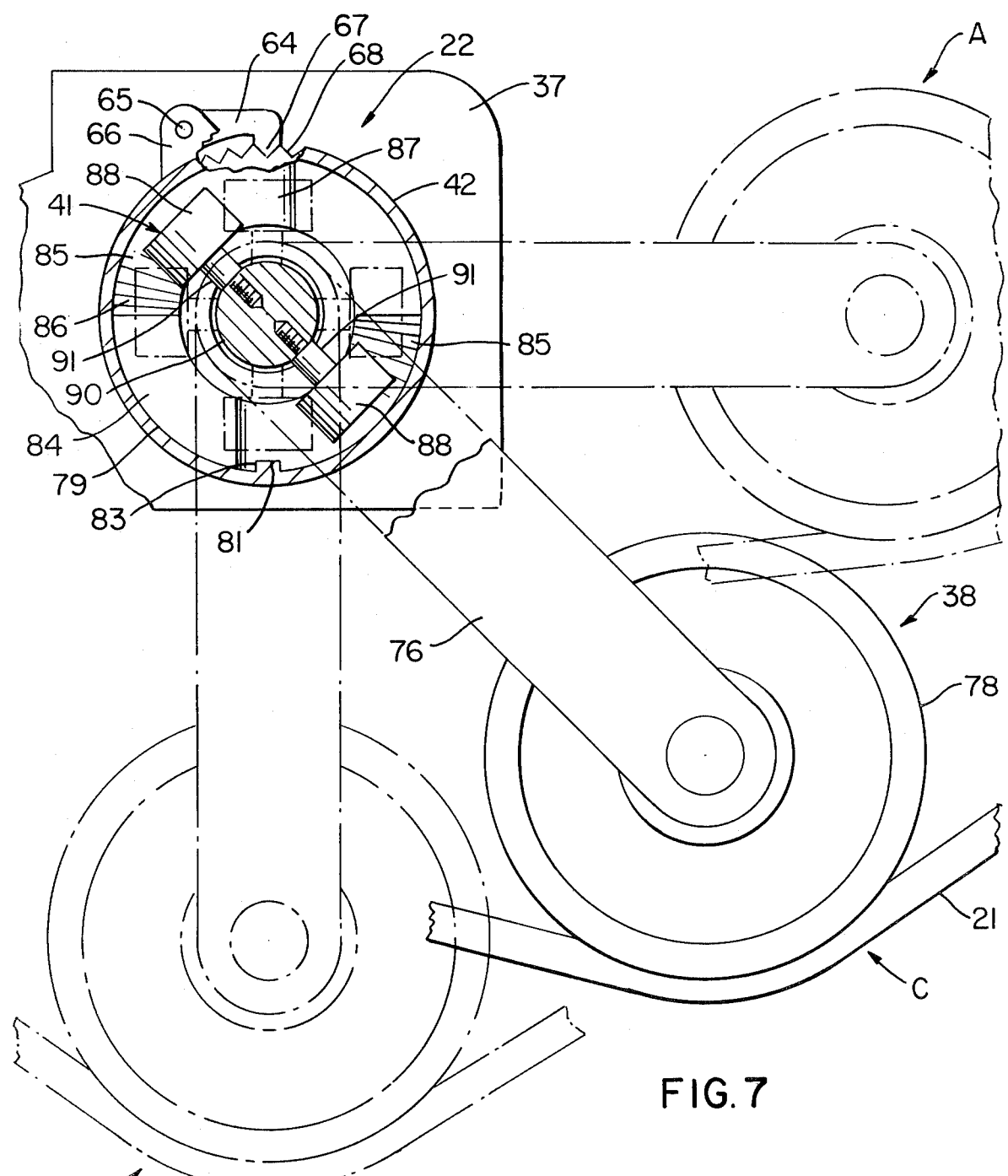
FIG. 7 is an enlarged fragmentary cross-sectional view of the belt tensioner of FIG. 6 and illustrates the same in the various positions for tensioning the belt of FIGS. 1 and 2 in the same manner as in FIG. 6.
Figure 6:
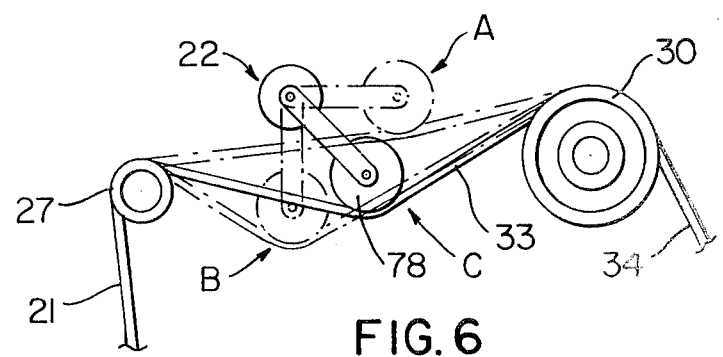
FIG. 6 is a fragmentary schematic view of the belt tensioner of FIGS. 1 and 2 being disposed in various positions for tensioning the belt of FIGS. 1 and 2.

Such position of the cam followers 88 relative to the high sides 86 of the cam surfaces 85 of the cam plate 79 would generally dispose the arm 78 of the belt engaging means 38 substantially horizontally as illustrated respectively in FIGS. 6 and 7 wherein the idler pulley 78 is disposed in the position illustrated generally by the arrow A. Such position of the pulley 78 has caused the cam plate 79 to be axially moved to the right in FIG. 3 the greatest amount thereof so that the compression spring 93 is under its greatest compression and has sufficient force to move the cam plate 79 to the left in FIG. 3 at least a distance that would cause the cam followers 88 to ride down the cam surfaces 85 thereof to the low ends 87 thereof and position the arm 76 and idler pulley 78 at the vertical position illustrated generally by the arrow B in FIGS. 6 and 7. However, it is to be understood that the belt tensioner 22 would probably never be required to position its arm 76 at the position B of FIGS. 6 and 7 and that the same would probably assume positions somewhat intermediate the positions A and B during the running of the engine 20, such as the position that is inidcated generally by the arrow C in FIGS. 6 and 7.

Thus, when the tensioner 22 is being initially mounted to the mounting bracket 37 of the engine 20 so as to place the idler pulley 78 against the belt 21 in its at rest position, the tubular support member 42 can be rotated relative to the mounting plate 54 so as to position the high sides 86 of the cam surfaces 85 of the cam plate 79 against the rollers 88 when the idler pulley 78 is against the belt 21, has taken up all slack thereof and is imposing its tension force thereon so that the spring 39 can be disposed in its most compressed position at this initial at rest position of the belt 21.

Such adjustment of the tubular member 42 relative to the mounting plate 54 can take place after the mounting plate 54 has been secured to the mounting bracket 37 by moving the locking pall 64 away from the teeth 68 of the mounting plate 54 and slightly rotating the tubular support member 42 relative to the mounting plate 54 as permitted by the mounting bolts 59 in the slots 58 of the end plate 48 in the manner presviously set forth. Once the rotational position of the support member 42 relative to the mounting plate 54 has been selected, the locking pall 64 is replaced into locking engagement between adjacent teeth 68 as illustrated in FIG. 4 so that further rotational movement of the support member 42 relative to the plate 54 cannot take place.

However, it is to be understood that the tubular member 42 can be permanently mounted to the mounting plate 54 without having the above described adjustment feature, if desired.

Thus, it can be seen that once the initial position of the tensioner 22 has been established so that the spring means 39 is under the desired amount of compression, the force of the spring means 39 tends to urge the belt engaging means 38 in its tensioning direction against the belt 21 with a force determined by the initial compression of the compression spring 93 in the at rest position of the engine 20.

Thereafter, each time the engine 20 is initially started so as to cause slack in the slack side 33 of the belt 21 and a tightening in the tight side 34 thereof, the force of the spring means 39 causes the idler pulley 78 to move inwardly to take up the slack of the belt 21 on the slack side 33 thereof and provide a tensioning force thereof as determined by the force of the spring 39, such inward movement of the pulley 78 being caused by the cam plate 79 being moved from right to left in FIG. 3 under the force of the compression spring 93 and thereby causing the rollers 88 to ride down the cam surface 85 from the high sides 86 thereof toward the low sides 87 thereof and thereby cause clockwise rotation of the shaft 53 in FIGS. 1 and 2.

Thus, it can be seen that as the belt 21 is travelling in the direction of the arrow 35 in FIGS. 1 and 2 by the running engine 20, any vibrations and oscillation of the belt 21, such as caused by the turning on and off of the air conditioning compressor 31 as previously set forth, will cause an up and down oscillation of the portion 33 of the belt 21 which movement is imposed on the idler pulley 78 of the tensioner 22.

In those instances where the deflection of the portion 33 of the belt 21 is upwardly in FIGS. 1 and 2 to tend to cause the pulley 78 to move upwardly relative to the support means 36, such movement causes the shaft 53 to tend to rotate in a counterclockwise direction in FIGS. 1 and 2 and thereby cause the cam followers 88 to ride up the cam surfaces 85 of the cam plate 79 from the low sides 87 thereof to the high sides 86 thereof and axially move the cam plate 79 from left to right in FIG. 3 to further compress the spring 93 so that the force of the spring 93 resists such upward movement of the pulley 78 in FIGS. 1 and 2 by a greater force as the spring 93 is being compressed to tend to retard such upward movement of the pulley 78.

Thus, it is believed that the tensioner 22 of this invention will provide a proper tensioning force on the belt 21 not only to tend to prevent undesirable oscillations and vibrations of the belt 21 as a result of cyclic load change, such as imposed by the compressor 31 in the manner previously described, but also to take up slack through the normal belt wear and heat variations to maintain the belt 21 under tension with a force sufficient to insure non-slipping engagement of the driven sheaves by the belt 21.

Accordingly, it can be seen that this invention not only provides an improved belt tensioner, but also this invention provides an improved method of making such a belt tensioner.

While the form and method of this invention now preferred have been illustrated and described as required by the Patent Statute, it is to be understood that other forms and method steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, movable cam means operatively associated with said support means and said belt engaging means for moving said belt engaging means relative to said support means, and spring means operatively associated with said support means and said cam means for urging said belt engaging means relative to said support means and against said belt with a force to tension said belt, the improvement wherein said support means comprises a tubular member having interconnecting means, said cam means being disposed in said tubular member, said cam means having interconnecting means operatively interconnected with said interconnecting means of said tubular member, both said interconnecting means cooperating and being adapted to permit said cam means to be axially movable relative to said tubular member while being non-rotatable relative to said tubular member.

2. A tensioner as set forth in claim 1 wherein said spring means is disposed in said tubular member.

3. A tensioner as set forth in claim 2 wherein said spring means comprises a mechanical spring means and bears against said support means and said cam means to tend to move said cam means in one axial direction in said tubular member.

4. A tensioner as set forth in claim 1 wherein said belt engaging means has cam follower means engaged by said cam means.

5. A tensioner as set forth in claim 4 wherein said cam follower means is disposed in said tubular member.

6. A tensioner as set forth in claim 5 wherein said belt engaging means comprises a shaft rotatably carried by said support means, said cam follower means being carried by said shaft.

7. A tensioner as set forth in claim 6 wherein said belt engaging means comprises an arm carried by said shaft and extending substantially transverse to the axis of rotation of said shaft, and an idler pulley means carried by said arm for engaging said belt.

8. A tensioner as set forth in claim 7 wherein said shaft has a portion thereof disposed in said tubular member.

9. A tensioner as set forth in claim 8 wherein said cam means has an opening therethrough which telescopically receives said portion of said shaft.

10. A tensioner as set forth in claim 9 wherein said spring means comprises a coiled compression spring having opposed ends, said spring being telescopically disposed on said portion of said shaft, said spring having one of said ends thereof bearing against said cam means and having the other of said ends bearing against said tubular member.

11. A tensioner as set forth in claim 10 wherein said interconnecting means of said tubular member comprises spline means, said interconnecting means of said cam means comprising groove means.

12. A tensioner as set forth in claim 10 wherein said cam follower means comprises a plurality of rollers rotatably carried by said shaft, each said roller having an axis of rotation that is substantially transverse to the axis of rotation of said shaft.

* * * * *